April 5, 1966 　　　J. D. USHER　　　3,244,227
PLATE TYPE HEAT EXCHANGERS
Filed June 9, 1964

United States Patent Office 3,244,227
Patented Apr. 5, 1966

3,244,227
PLATE TYPE HEAT EXCHANGERS
John D. Usher, Redhill, Surrey, England, assignor to The A.P.V. Company Limited, Sussex, England, a British company
Filed June 9, 1964, Ser. No. 373,630
Claims priority, application Great Britain, July 11, 1963, 27,584/63
3 Claims. (Cl. 165—167)

This invention relates to plate type heat exchangers and more particularly to arrangements for retaining the interplate gaskets against the internal pressure in the flow space between the plates.

In certain constructions of heat exchanger plates the outer wall of a generally peripheral gasket recess is folded downwardly to form interplate supporting surfaces for engagement, either continuous or intermittent, with supporting surfaces on the adjacent plates. Such downward folding forms a recess on the under side of the plate and according to this invention such recess is utilized to provide additional retention for the gasket in the plate below.

Accordingly, the present invention consists in a plate heat exchanger including interplate gaskets housed in generally peripheral recesses in the plates, the outer wall of the gasket recess of at least one plate being at least in part folded downwardly to define a secondary recess opening in the opposite direction to the gasket recess, a portion of the gasket in the adjacent plate in the said direction having a raised section located in the secondary recess to provide additional support for the gasket against the pressure in the flow space between the plates.

In a preferred form of the invention each plate is formed with alternate sections of equal length in which the gasket recess has its outer wall bent down to define the oppositely facing secondary recess and in which the gasket recess is intermittently or continuously widened. The correspondingly widened portions of the gasket are provided with the raised section.

The invention further consists in a gasket for use in a heat exchanger as set forth above comprising alternating portions with and without raised sections adjacent one edge.

In the preferred form of gasket, the portions with raised sections have a variable width, with a straight inner edge and a transversely variable outer edge, the raised section lying parallel with the straight inner edge but adjacent the outer edge.

Figure 1:
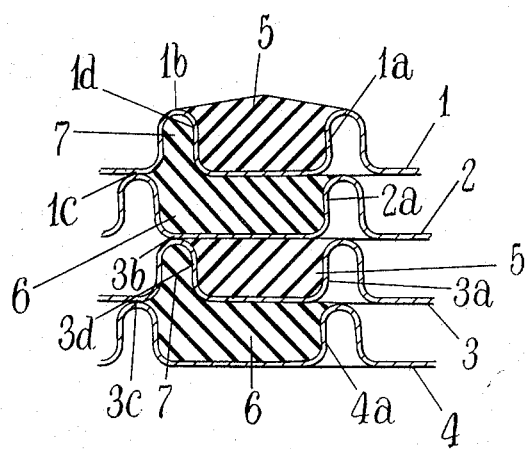
Figure 2:
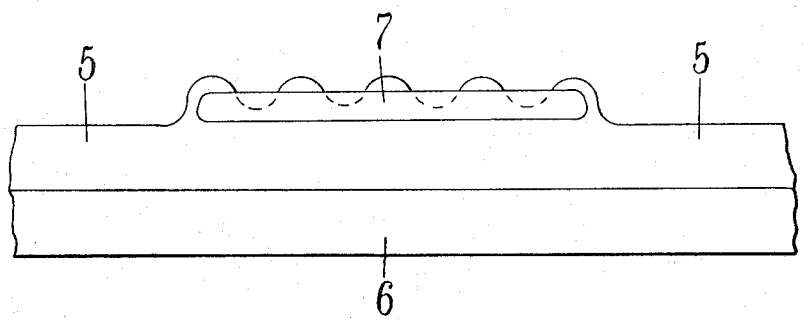

The invention will be further described with reference to the accompanying drawings of a preferred form of the invention, and wherein:

FIGURE 1 is a section through a peripheral portion of four superposed plates, and FIGURE 2 is a plan view of a length of gasket.

FIGURE 1 shows superposed peripheral portions of four successive plates numbered from 1 to 4 formed with gasket recesses 1a to 4a respectively. In the section shown in FIGURE 1 the outer walls of recesses 1a and 3a are folded downwardly to provide interplate supporting surfaces 1b, 1c, 3b and 3c co-operating with the adjacent plates on either side. Such folding down also defines downwardly opening secondary recesses 1d and 3d as shown.

The plates 2 and 4 are formed in the region of the section taken in FIGURE 1 so that the inner walls of the gasket recesses are straight and the outer walls are corrugated in transverse manner so that the width of the gasket recess is variable. The section of FIGURE 1 is taken at a widest point of the recesses 2a and 4a.

In the preferred embodiment of the invention, the roles of the plates 1 and 3 are interchanged with those of plates 2 and 4 at intervals round the periphery of the plates.

The gaskets thus have, as shown in FIGURE 2, alternating portion 5 of constant width and portions 6 of variable width. Each portion 6 of variable width has an upstanding portion 7 formed therein to enter and co-operate with the recesses such as 1d and 3d to support the gasket against the pressure of the fluid flowing in the interplate flow spaces.

Various modifications may be made within the scope of the invention. Thus alternate plates may each be completely of one type with a corresponding arrangement of gaskets.

I claim:

1. In a plate type heat exchanger, a pack of plates in spaced face to face relationships defining flow spaces therebetween, adjacent flow spaces being in heat exchanger relationship through the intervening plates, each plate including a peripheral gasket receiving recess, interplate gaskets in said recesses, an outer wall on each of said recesses, the outer wall of the recess of at least one plate being folded back to define a secondary recess opening in the opposite direction to the gasket receiving recess along at least part of the length of the said gasket receiving recess, a portion of the gasket housed in the gasket receiving recess in the adjacent plate in the said direction having a raised section located in the secondary recess in the said at least one plate to provide additional support for the gasket against fluid pressure in the flow space between the said adjacent plate and the said at least one plate.

2. The structure set forth in claim 1, further characterised in that each plate is shaped so that the gasket receiving recess is formed with two sets of sections alternating and of equal length, in which one set of sections has the outer wall bent down to define the oppositely facing secondary recess and in which the other set of sections has at least one or more portions of the outer wall outwardly placed to widen the recess, the raised sections being provided on widened portions of the gasket corresponding to the widened portions of the gasket recess, the plates being located so that juxtaposed sections of the edges of adjacent plates comprise different sets.

3. The structure set forth in claim 2, further characterised in that the said widened portions are intermittently widened and the raised sections extend laterally beyond the narrower parts of the wider portions of the gasket.

References Cited by the Examiner

FOREIGN PATENTS 502,819  10/1939  Great Britain.

ROBERT A. O'LEARY, Primary Examiner.

T. W. STREULE, Assistant Examiner.